(12) United States Patent
Nakayama et al.

(10) Patent No.: US 6,787,769 B2
(45) Date of Patent: Sep. 7, 2004

(54) CONDUCTIVE PROBE FOR SCANNING MICROSCOPE AND MACHINING METHOD USING THE SAME

(75) Inventors: Yoshikazu Nakayama, 9-404, 14-2, Korigaoka 1-chome, Hirakata City Osaka (JP), 573-0084; Seiji Akita, Izumi (JP); Akio Harada, Osaka (JP); Takashi Okawa, Osaka (JP); Yuichi Takano, Osaka (JP); Masatoshi Yasutake, Sunto-gun (JP); Yoshiharu Shirakawabe, Sunto-gun (JP)

(73) Assignees: Yoshikazu Nakayama, Osaka (JP); Daiken Chemical Co., Ltd., Osaka (JP); Seiko Instruments Inc., Chiba (JP)

( * ) Notice: Subject to any disclaimer, the term of this patent is extended or adjusted under 35 U.S.C. 154(b) by 0 days.

(21) Appl. No.: 10/182,331
(22) PCT Filed: Sep. 28, 2001
(86) PCT No.: PCT/JP01/08615
§ 371 (c)(1),
(2), (4) Date: Jul. 26, 2002
(87) PCT Pub. No.: WO02/42741
PCT Pub. Date: May 30, 2002

(65) Prior Publication Data
US 2003/0001091 A1 Jan. 2, 2003

(30) Foreign Application Priority Data
Nov. 26, 2000 (JP) .......................... 2000-403559

(51) Int. Cl.⁷ .............................................. G01N 23/00
(52) U.S. Cl. ........................ 250/306; 250/234; 250/310; 250/311; 156/272.2; 422/198; 73/105; 73/104
(58) Field of Search ................................ 250/306, 234, 250/310, 311; 156/272.2; 422/198; 73/105, 104

(56) References Cited

U.S. PATENT DOCUMENTS 6,528,785 B1 * 3/2003 Nakayama et al. ......... 250/306

FOREIGN PATENT DOCUMENTS

| EP | 1 054 249 A1 | 11/2000 |
|---|---|---|
| JP | H6-94813 | 4/1994 |
| JP | H7-83942 | 3/1995 |
| JP | H9-33542 | 2/1997 |
| JP | H10-78438 | 3/1998 |
| JP | 2000-268741 | 9/2000 |
| WO | WO 00/33052 | 6/2000 |

OTHER PUBLICATIONS

Nakagawa et al. "Scanning type probe Microscope . . .", Pub. No.: US 2002/0171038 A1, publicatioon date: Nov. 21,2002.*
Bonnell et al., "Tip Calibration Standard and Method of Tip Calibration", Pub. No.: US 2003/0132376 A1, publication date: Jul. 17, 2003.*

* cited by examiner

Primary Examiner—John R. Lee
Assistant Examiner—Zia R. Hashmi
(74) Attorney, Agent, or Firm—Koda & Androlia

(57) ABSTRACT

A conductive probe for a scanning type microscope that captures the substance information of the surface of a specimen by the tip end of a conductive nanotube probe needle fastened to a cantilever, in which the conductive probe is constructed from a conductive film formed on the surface of the cantilever, a conductive nonatube with its base end portion being fixed in contact which the surface of a predetermined of the cantilever, and a conductive deposit which fastens the conductive nanotube by covering from the base end portion of the nonatube to a part of the conductive film. The conductive nonatube and the conductive film are electrically connected to each other by the conductive deposit.

9 Claims, 4 Drawing Sheets

CONDUCTIVE PROBE FOR SCANNING MICROSCOPE AND MACHINING METHOD USING THE SAME

TECHNICAL FIELD

The present invention relates to a probe for a scanning type microscope which images a surface structure of a specimen, by using a conductive nanotube as a probe needle. More particularly, the present invention relates to a probe for a conductive scanning type microscope in which a conductive nanotube and a cantilever are electrically connected by coating both of them with a conductive deposit, a conductive film and a conductive coating film, and relates further to a machining method using the same, wherein a voltage can be applied between the conductive nanotube and a specimen so that a current flows.

BACKGROUND ART

In order to image a surface structure of a specimen by means of an atomic force microscope abbreviated as AFM, a probe needle is needed which is caused to approach to the surface of the specimen and to obtain information from it. As the probe needle, a cantilever made of silicon or silicon-nitride, which has a protruding portion (or pyramid portion) at the tip end, has been known in the past.

A conventional cantilever is formed by means of the micro-fabrication technique such as lithography, etching, etc. Since the cantilever detects atomic force from the surface of specimen by the tip end of protruding portion, the degree of clearness of an image is determined by the degree of sharpness of the tip end. Then, in the sharpening treatment of the tip end of the protruding portion which serves as a probe needle, an oxide process using a semi-conduction treatment technique and an etching process of an oxide film are utilized. However, there is a lower limit in the reduction of size even in the semi-conductor treatment technique, so that the degree of sharpness of the tip end of the protruding portion above-described is also physically limited.

On the other hand, a carbon nanotube was discovered as a carbon matter having a new structure. The carbon nanotube is from about 1 nm to several 10 nm in diameter and several $\mu$m in length, and its aspect ratio is about 100~1000. It is difficult to form a probe needle of 1 nm diameter by the present technique of semiconductor. Therefore, in this respect, the carbon nanotube provides best condition for the probe needle of the AFM.

In such a situation, H. Dai and others published, in Nature (Vol.384, Nov. 14, 1996), a report with respect to the AMF probe in which a carbon nanotube is stuck on the tip of the protruding portion of a cantilever. Though the probe proposed by them was of epoch-making, the carbon nanotube fell off from the protruding portion during repeatedly scanning surfaces of specimens, since the carbon nanotube was simply stuck on the protruding portion.

In order to solve this weak point, the present inventors have achieved to develop a method fastening firmly the carbon nanotube to the protruding portion of the cantilever. Results of this invention have been published; first fastening method as the publication No.2000-227435, and second fastening method as the publication No.2000-249712.

The first fastening method above-mentioned is that a coating film is formed by means of irradiating an electron beam to the base end portion of a nanotube, and next the nanotube is fastened to the cantilever by means of coating the nanotube with the coating film. The second method is that the base end portion of the nanotube is fusion-fastened to the protruding portion of the cantilever by means of irradiating an electron beam on the base end portion of the nanotube or by means of electrically transmitting it.

As a marketed cantilever, as previously mentioned, is manufactured by means of the semiconductor process-technique, its material is silicon or silicon-nitride. The silicon-nitride is insulator, though the silicon is semiconductor. It, therefore, was incapable to apply a voltage or to flow current the between the probe needle of the conductive nanotube and a specimen, even if conductive nanotubes such as carbon nanotube, etc. was fastened to the protruding portion of the cantilever, since the cantilever itself had not conductivity.

In a case that a probe has not conductivity, it means that uses of the probe is much limited. For example, the probe can not be used for a scanning tunnel microscope, as the tunnel microscope images a specimen by detecting a tunnel current between the probe needle and the specimen.

Furthermore, by using this probe, it is unable to heap up atoms on the surface of a specimen, to transfer or to take out atoms form the surface of a specimen. In order to process a specimen by means of operating atoms in this manner, it is necessary to apply a voltage to the probe needle. The technique of nano-process is thought as a fundamental technology as well as bio-technology in the 21 century. Hence, the utility of a probe will be much limited in the future, without solving this problem.

Accordingly, an object of the present invention is to realize a probe for a conductive scanning type microscope in which a voltage is applicable and a current can flows between a conductive nanotube and a specimen, by means of electrically connecting cantilever and a probe needle which comprise the conductive nonotube.

DISCLOSURE OF INVENTION

The present invention provides, in a probe for a scanning type microscope, by which substance information of a specimen is obtained by means of a tip of a probe needle of a conductive nanotube fastened to a cantilever; a probe for a conductive scanning type microscope characterized in that a conductive nanotube and a conductive film are caused to be electrically transmitted by means of a conductive resolution deposit of organic gas, wherein the probe comprises a conductive films formed on the surface of said cantilever, the conductive nanotube, a base end portion of which is disposed in contact with a specified portion of the surface of the cantilever, and the conductive resolution deposit with which the conductive nanotube is fastened by coating from the base end portion of the conductive nanotube to a part of said conductive films.

The present invention provides, in a probe for a scanning type microscope which obtains substance information of a specimen surface through the tip of a conductive nanotube probe needle fastened to a cantilever; a probe for a conductive scanning type microscope characterized in that a conductive nanotube and a conductive film are caused to be electrically transmitted by means of a conductive deposit, wherein said probe comprises a conductive films formed on the surface of said cantilever, a conductive nanotube, a base end portion of which is disposed in contact with a specified surface portion of this conductive film, and a conductive deposit, with which the base end portion of the conductive nanotube is coated in order to fasten it.

The present invention provides a probe for a conductive scanning microscope described in the first and second parts of the present invention, wherein the conductive state between the conductive nonotube and the cantilever is made accurate by means of furthermore forming a conductive coating film on said conductive deposit, so that the coating film reaches to both the conductive nanotube and the conductive film.

The present invention provides, in a probe for a conductive scanning type microscope which obtains substance information of a surface of a specimen through the tip portion of a conductive nanotube probe needle adhered to a cantilever; a probe for a conductive scanning type microscope which is characterized in that a conductive nanotube and a cantilever are caused to be in a electrically transmitted state, wherein the probe comprises a conductive nanotube, the base end portion of which is disposed in contact with the specified surface portion of said cantilever, a conductive deposit with which a conductive nanotube is fastened to a cantilever by coating the base end portion of it, and a conductive coating film is formed so that it covers this conductive deposit and reaches both the conductive nanotube and the cantilever surface.

The present invention provides a probe for a conductive scanning type microscope described in the third and fourth parts of the present invention, wherein said conductive coating film is formed so that it covers both the tip end and the tip end portion of the nanotube.

The present invention provides a probe for a conductive scanning type microscope described in the fifth part of the present invention, wherein a conductive substance constituting the above described conductive coating film is magnetic substance.

The present invention provides a method to process specimens by means of a probe for a conductive scanning type microscope which is characterized in that by using the probe for the conductive scanning type microscope described in the fifth part of the present invention, the conductive coating film made of a metal film serves as a metal source and by applying a predetermined voltage between this probe for the conductive scanning type microscope and a specimen, metallic atoms included in the metal source are ion-emitted by electric field from the tip of the nanotube to a specimen surface and as the result, and the atoms form a metallic deposit on the surface of the specimen.

The present invention provides a processing method described in the seventh part of the present invention, wherein a diameter of the above-described metallic deposit is 50 nm or less.

The present inventors have earnestly investigated development of conductive scanning type microscopes and have finally achieved an idea of a method to electrically connect a conductive nanotube with a cantilever by a conductive film or by a conductive coating film.

The fundamental structure is that, by preparing a conductive film formed on a cantilever, this conductive film is caused to be electrically connected with a conductive nanotubes by a conductive deposit. In order to make this electric conductivity assured, the structure is employed in that the conductive nanotubes and the conductive film are forced to be electrically connected by means of covering over the conductive deposit with a conductive coating film.

The term so called "conductive nanotube" refers the nanotube that possesses electrical conductivity. In general, there are carbon nanotubes, etc. as conductive nanotubes and there are BN series nanotubes, BCN series nanotubes, etc. as insulation nanotubes. However, insulation nanotubes can be transmuted to conductive nanotubes by means of forming conductive films on surfaces of the insulation nanotubes. Conductive nanotubes include the nanotubes that get conductivity by such a processing.

Conductive films formed on cantilevers are, so called, electrically conductive films such as metallic films, carbon films, etc. As the manufacturing method, various methods are able to be utilized such as physical vapor deposition method (PVD) or chemical vapor deposition method (CVD) which include vacuum vapor deposition, ion-plating, spattering, etc., and also such as electric plating, electroless plating, etc. The conductive films thus manufactured have a function as electrodes which is connected with external power supply.

Conductive deposits fastening conductive nanotubes to cantilevers are formed by means of heaping up decomposed-components of organic gases on necessary portions, while decomposing organic gases such as hydrocarbon series gases or organic metallic gases by means of electron beams or ion beams. As for the materials, carbon deposits or metal deposits are used.

In a case where the organic gas is hydrocarbon series gas, the above-described decomposed-deposit is carbon deposit. In general, though carbon deposits comprising graphite substances possess conductivity, deposits comprising amorphous carbons widely distribute with respect to the quality of conductivity, from conductors to insulators, according to thickness of films. Thin films of amorphous carbon are conductive, and thick ones are insulated. Accordingly, by fastening a conductive nanotube to a cantilever with extremely thin films of carbon deposits, the conductivity is caused to be maintained.

In a case where the organic gas is organic metallic gas, the above-described decomposed-deposit forms a metal deposit. This metal deposit, owing to its conductive property, can be utilized as the conductive deposit of the present invention. As metal deposits have conductivity, irrespective of the thickness of metal deposits, metal deposits are more useful than carbon deposits in order to assure conductivity.

As the above-described hydrocarbon series substances, there are hydrocarbons of methane series, hydrocarbons of ethylene series, hydrocarbons of acetylene series, cyclic hydrocarbons, etc.; more concretely saying, hydrocarbons of less molecular weight such as ethylene or acetylene are favorable among them. Furthermore, as the above-described organic metallic gases, the following gases can be utilized; for examples, $W(CO)_6$, $Cu(hfac)_2$, (hfac: hexa-flouro-acetyl-acetonate), $(CH_3)_2AlH$, $Al(CH_2-CH)(CH_3)_2$, $[(CH_3)_3Al]_2$, $(C_2H_5)_3Al$, $(I-C_4H_9)_3Al$, $(CH_3)_3AlCH_3$, $Ni(CO)_4$, $Fe(CO)_4$, $Cr[C_6H_5(CH_3)_2]$, $Mo(CO)_6$, $Pb(C_2H_5)_4$, $Pb(C_5H_7O_2)_2$, $(C_2H_5)_3PbOCH_2C(CH_3)_2$, $(CH_3)_4Sn$, $(C_2H_5)_4$ Sn, $Nb(OC_2H_5)_5$, $Ti(i-OC_3H_7)_4$, $Zr(C_{11}H_{19}O_2)_4$, $La(C_{11}H_{19}O_2)_3$, $Sr[Ta(OC_2H_5)_6]_2$, $Sr[Ta(OC_2H_5)_5(Oc_2H_4OcH_3)]_2$, $Ba(C_{11}H_{19}O_2)_2$, $(Ba,Sr)_3(C_{11}H_{19}O_2)$, $Pb(C_{11}H_{19}O_2)_2$, $Zr(OtC_4H_9)_4$, $Zr(OiC_3H_7)(C_{11}H_{19}O_2)_3$, $Ti(OiC_3H_7)_2(C_{11}H_{19}O_2)$, $Bi(OtC_5H_{11})_3$, $Ta(OC_2H_5)_5$, $Ta(OiC_3H_7)_5$, $Nb(OiC_3H')_5$, $Ge(OC_2H_5)_4$, $Y(C_{11}H_{19}O_2)_3$, $Ru(C_{11}H_{19}O_2)_3$, $Ru(C_5H_4C_2H_5)_2$, $Ir(C_5H_4C_2H_5)(C_8H_{12})$, $Pt(C_5H_4C_2H_5)(CH_3)_3$, $Ti[N(CH_3)_2]_4$, $Ti[N(C2H5)2]4$, $As(OC_2H_5)_3$, $B(OC_2H_3)_3$, $Ca(OCH_3)_2$, $Ce(OC"H_5)_3$, $Co(OiC_3H_7)_2$, $Dy(OiC_3H_7)_2$, $Er(OiC_3H_7)_2$, $Eu(OiC_3H_7)_2$, $Fe(OCH_3)_3$, $Ga(OCH_3)_3$, $Gd(OiC_3H_7)_3$, $Hf(OCH_3)_4$, $In(OCH_3)_3$, $KOCH_3$, $LiOCH_3$, $Mg(OCH_3)_2$, $Mn(OiC_3H_7)_2$, $NaOCH_3$, $Nd(OiC_3H_7)_3$, $Po(OCH_3)_3$, $Pr(OiC_3H_7)_3$, $Sb(OCH_3)_3$, $Sc(OiC_3H_7)_3$, $Si(OC_2H_5)_4$, $VO(OCH_3)_3$, $Yb(OiC_3H_7)_3$, $Zn(OCH_3)_2$, etc.

A conductive coating film is formed so as to cover conductive deposit, moreover so as to coat from conductive nanotube to conductive film. That is, the conductive nanotube and conductive film are electrically connected by the conductive coating film. And even in a case where the conductive film does not exist, the conductive coating film is utilized as an electrode film, by means of forming the coating film extended to the surface of a cantilever portion.

Accordingly, the coating film always exists, in any case either it is formed locally at a very small region, or extendedly over on a wide region. In the case of forming the coating film on the small region, the method to form a conductive deposit can be employed. In other words, in the case of the small region, a conductive coating film is formed by means of decomposing organic gases by an electron beam or an ion beam, and subsequently by means of heaping up locally the decomposed gases. On the other side, in the case of the wide region, various methods can be employed such as physical vapor deposition (PVD) or chemical vapor deposition (CVD), including vacuum vapor deposition, ion-plating, spattering, etc. and also such as electric plating or electroless plating, etc.

In a case where a conductive coating film is formed by coating a tip end and a tip end portion of a nanotube, the quality of its conductive substance is given to the probe needle of a nanotube. For example, in cases where strong magnetic metals such as Fe, Co, Ni, etc. are used as the conductive substances, the probe needle of the nanotube can detect the magnetic property of surfaces of specimens. Namely, this probe is able to function as the probe needle of a magnetic force microscope (MFM) which detects magnetic distribution of a specimen.

By approaching the probe for this conductive scanning type microscope to a specimen, in which the probe is coated with metal up to the tip end, and by applying a voltage between the specimen and the probe so that the specimen is cathode and the probe is anode, the metal of the tip end of a nanotube is ionized by the super-strong electric field which is induced between the tip end of the nanotube and the specimen. This metal ions are accelerated by the electric field to collide with the surface of the specimen and accumulate to form a metal deposit on the surface of the specimen. In this manner, the processes for specimen such as transposition and deposition of metallic ions, etc. can be performed by means of application of a voltage.

BEST MODE FOR CARRYING OUT THE INVENTION

In the following, a probe for a conductive scanning type microscope and a processing method that uses such a probe according to the embodiments of the present invention will be described in detail with reference to the accompanying drawings.

Figure 1:
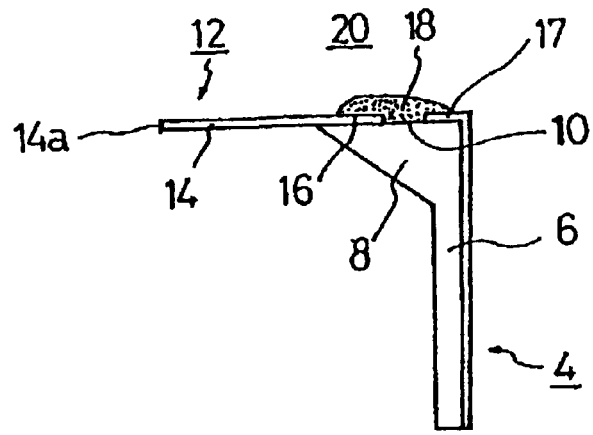
FIG. 1 is an outline diagram explaining first mode for a probe for a conductive scanning type microscope related to the present invention.

FIG. 1 is an outline diagram explaining first mode for a probe for a conductive scanning type microscope related to the present invention. A cantilever 4 is an assembly which is used as a AFM probe needle, and which comprises a cantilever portion 6 and a protruding portion 8 that is formed in a protruding fashion at the tip of the cantilever. On this cantilever 4, a conductive film 17 is formed which extends from the cantilever portion 6 to the surface of the protruding portion 17. This conductive film comprises conductive materials such as metal, carbon, etc.

A base end portion 16 of a conductive nanotube 12 such as a carbon nanotube, etc. is disposed in contact with a surface of a protruding portion 10, and the base end portion 16 and the conductive film 17 are not contacted with each other in the present mode. A tip portion 14 of the conductive nanotube 12 is protruding outside and its tip 14a serves as the tip of a probe needle for detecting signals.

The base end portion 16 is tightly fastened to the surface of the protruding portion 10 by means of a conductive deposit 18 of such as metal, cabon, etc., and a probe for a conductive scanning type microscope 20 ( hereafter called probe) is accomplished, when the conductive nanotube 12 is integrally fastened to the cantilever 4 by means of this conductive deposit 18. The more tight is the fastening by means of the conductive deposit, the more durable is the probe 20, so that the conductive nanotube 12 does not fall off.

Furthermore, this conductive deposit 18 is formed so as to covered one end portion of the conductive film 17. Accordingly, the conductive nanotube 12 and the conductive film 17 are electrically connected with each other, by means of the conductive deposit 18. The conductive film 17 of the cantilever 6 has a function for an electrode film, and through this electrode, a voltage can be applied and electric current is caused to flow to the conductive nanotube 12.

Figure 2:
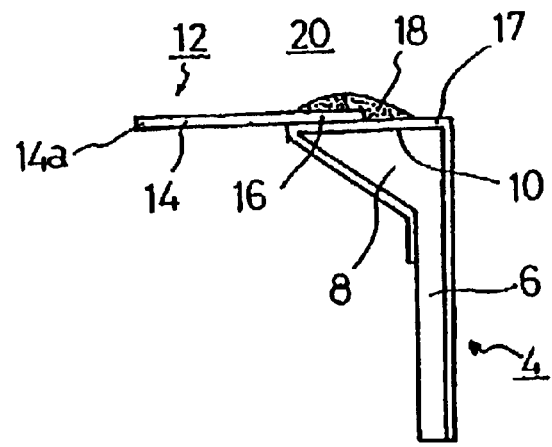
FIG. 2 is an outline diagram explaining second mode for a probe for a conductive scanning type microscope related to the present invention.

FIG. 2 is an outline diagram explaining second mode for a probe for a conductive scanning type microscope related to the present invention. Explanation for the same parts as FIG. 1 will be omitted, by numbering the same numbers to the corresponding parts, so that explanation for only different parts will be given in the following. In this mode, the conductive film 17 is formed so as to extend not only to the cantilever 6 but also to a whole surface of the protruding portion 8.

The base end portion 12 of the conductive nanotube 12 is disposed in contact with on the conductive film 17 of the protruding portion surface 10. The probe 20 is accomplished when the conductive deposit 18 is formed so as to cover the surface of this base end portion and the conductive nanotube 12 is tightly fastened to cantilever 4. Since the base end portion 16 contacts with the conductive film 17, both are electrically connected. In order to make this conductivity assured, the conductive deposit 18 works.

If there is, due to some reason, an insulator such as impurity between the base end portion 16 and the conductive film 17, the conduction between the base end portion 16 and the conductive film 17 is not assured. In such a case, a conductivity between both is attained by means of the conductive deposit 18. That is, in this mode, the conductivity is doubly guaranteed by means of the contact of the conductive nanotube 12 with the conductive film 17 and also by means of the conduction between them which is forced by the conductive deposit.

Figure 3:
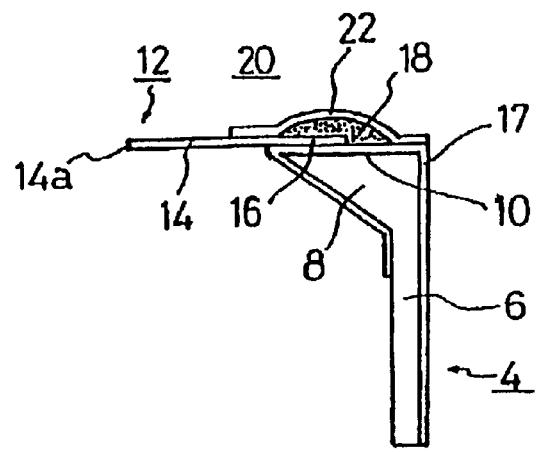
FIG. 3 is an outline diagram explaining third mode for a probe for a conductive scanning type microscope related to the present invention.

FIG. 3 is an outline diagram explaining third mode for a probe for a conductive scanning type microscope related to the present invention. This mode is what to form a conductive coating film 22 in addition to the second mode. That is, the conductive film 22 is formed to cover the conductive deposit 18, where the conductive film is extended from the conductive nanotube 12 to the conductive film 17, so that the conductivity between the conductive nanotube 12 and the conductive film 17 is more certainly guaranteed.

Figure 4:
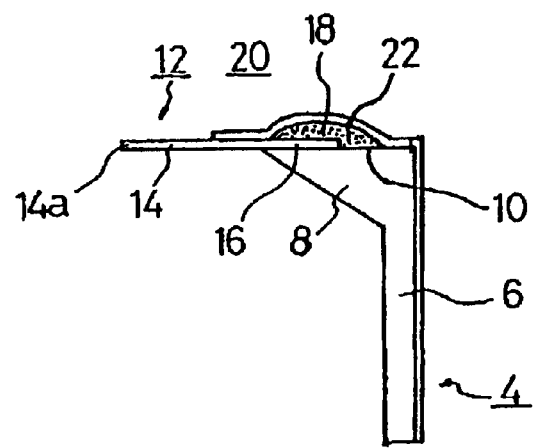
FIG. 4 is an outline diagram explaining fourth mode for a probe for a conductive scanning type microscope related to the present invention.

FIG. 4 is an outline diagram explaining fourth mode for a probe for a conductive scanning type microscope related to the present invention. In this mode, the conductive film 17 is not formed on the cantilever 4. Manufacturing process of the probe 20 is accomplished when the base end portion 16 of the conductive nanotube 12 is disposed in contact with the protruding portion surface 10 of the cantilever 4, and the conductive deposit 18 is formed on both of them and tightly adhered, and furthermore the conductive coating film 22 is formed on them.

This coating film 22 is formed from the conductive nanotube 12 to the cantilever part 6, so as to cover the conductive deposit 18, and the conductive coating film 22 on the cantilever part 6 functions as an electrode film. Accordingly, by means of the conductive coating film 22 the conductive nanotube is electrically connected to the cantilever 4, and from the conductive coating film 22 to the conductive nanotube a voltage is applied from an external power supply and a current is caused to flows.

Figure 5:
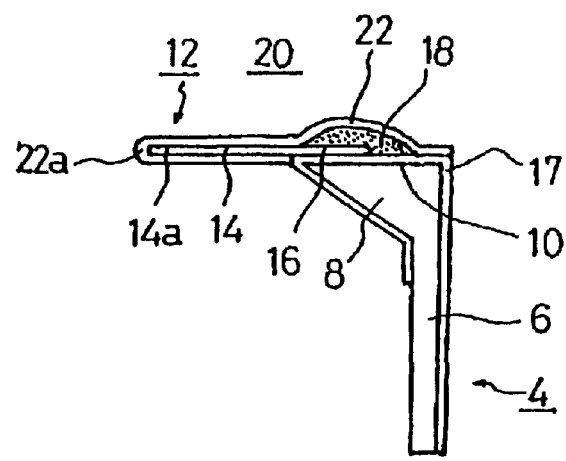
FIG. 5 is an outline diagram explaining fifth mode for a probe for a conductive scanning type microscope related to the present invention.

FIG. 5 is an outline diagram explaining fifth mode for a probe for a conductive scanning type microscope related to the present invention. This fifth mode is that the conductive coating film 22 in the third mode is extended so that it coats the tip portion 14 of the nanotube 12. The conductive coating film 22 is coating the tip end 22a and gives quality of conductive substance to a probe needle.

In a case that conductive coating films are made of metallic atoms of ferromagnetic substances such as Fe, Co and Ni, nanotube probe needles have quality to detect magnetism of specimens. That is, the ferromagnetic metal of the tip end of the probe needle is caused to detect magnetism of the specimen surface and to be able to image magnetic images of the specimen surface.

Figure 6:
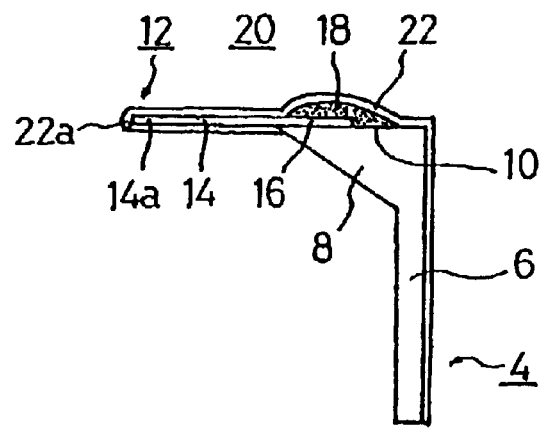
FIG. 6 is an outline diagram explaining sixth mode for a probe for a conductive scanning type microscope related to the present invention.

FIG. 6 is an outline diagram explaining sixth mode for a probe for a conductive scanning type microscope related to the present invention. This sixth mode is that the conductive coating film 22 in the fourth mode is extended, so that it coats the tip portion 14 of the nanotube 12. The conductive coating film 22 is coating the tip end 22a and gives quality of conductive substance to a probe needle. As the function of the probe needle is same as that of the fifth mode, the explanation of it is omitted.

Figure 7:
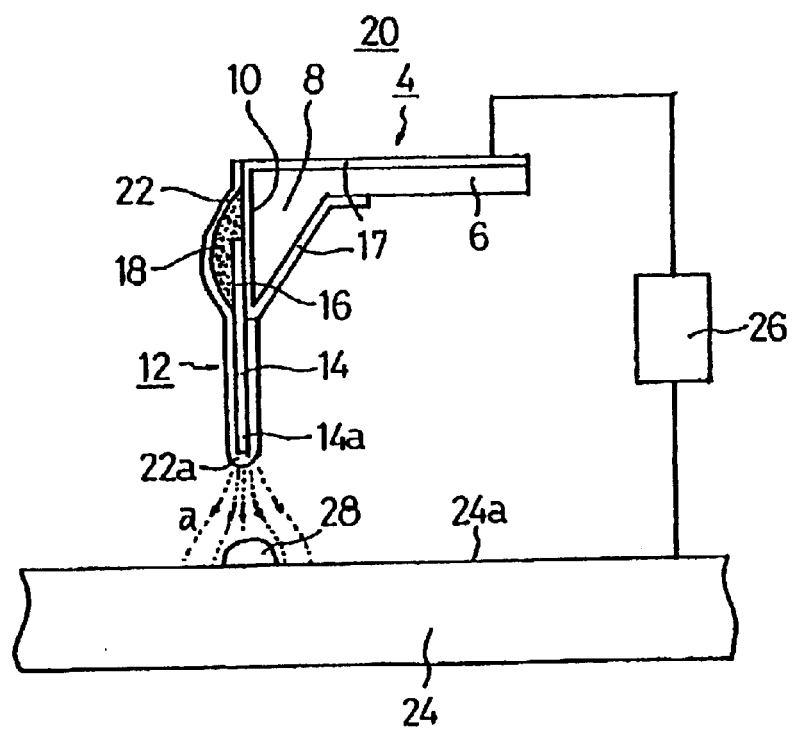
FIG. 7 is an outline diagram explaining a method, by which a small dot is formed by means of a probe for a conductive scanning type microscope related to the present invention.

FIG. 7 is an outline diagram explaining a method to form a fine dot on a surface of a specimen, by using a probe for a conductive scanning type microscope related to the present invention. The probe 20 is the probe for a conductive scanning type microscope which is manufactured in the fifth mode, and a direct-current voltage, for example about 10 volts, can be applied between the conductive film 17 of this probe 20 and the specimen 24, by connecting them with a power supply 26.

When the conductive film 22 is formed with metal and a voltage is applied so that the conductive film 17 is anode and a specimen is cathode, a super-high electric field shown by dot lines is made from the tip end 22a of the coating film to the specimen surface. By means of this electric field, metallic atoms are ionized and are accelerated to the arrow direction a by the force of the electric field, so that the metallic atoms heap up to form the small dot 28 on the specimen surface.

The diameter of the nanotube 12 is about 1 nm or more. Owing to utilizing this fine nanotube 12 as a metal source, it is easy to form fine dots, diameters of which are 50 nm or less. Since a nano-circuit or a nano-structure can be formed on a specimen surface 24a by using this fine dot 28, one of technique for nano-engineering is established by means of the probe 20 of the present invention.

It is needless to say that the present invention is not limited to the above-described embodiments; and various modifications and design changes, etc. within this limits that involve no departure from the technical spirit of the present invention are included in the scope of the present invention.

Industrial Applicability

According to the present invention, since the conductive nanotube and the conductive film are caused to be in electrical conductive state by means of the conductive decomposed deposit, a probe of a conductive scanning type microscope can be provided, wherein a voltage can be applied to or a current can flow through the conductive nanotube by connecting the conductive film with an external power supply.

According to the present invention, by means of disposing the root end portion of a conductive nanotube in contact with a specified surface portion of a conductive film, the conductive film and the conductive nanotube are first caused to be conductive, and furthermore by means of forming a conductive deposit which coats the base end portion, the conductivity between both the deposit and the base end portion is certainly guaranteed. Accordingly, the probe for the conductive scanning type microscope can be provided, in which the fastening of the conductive nanotube, together with an application of a voltage and an electric current are certainly guaranteed.

According to the present invention, the probe for a conductive scanning type microscope can be provided, in which the conductivity between a conductive nanotube and a cantilever is caused to be more assured, since a conductive coating film which reaches to the conductive nanotube and a conductive film, is moreover formed on a conductive deposit.

According to the present invention, the probe for a conductive scanning type microscope can be provided, of which the structure is simple and the conductivity is assured at low price, since a conductive coating film which reaches a conductive nanotube and a conductive cantilever surface is formed on a conductive deposit, so that the conductive coating film is utilized as a conductive film.

According to the present invention, a quality of conductive substance is given to the probe needle of a nanotube, since a conductive coating film is formed so that it coats the tip end portion and the tip of the nanotube. By using the probe possessing this specific quality, specific substance properties of a specimen surface to which this quality of the probe responds sensitively can be detected at a high sensitivity.

According to the present invention, magnetic information at the atomic level of a surface of specimen can be detected at a high sensitivity, by means of scanning the specimen surface by using this probe, since the conductive substance forming the above-described conductive coating film is metal.

According to the present invention, by using the probe for a conductive scanning type microscope, by means of applying a voltage, metallic atoms can remove at will from the probe to a surface of a specimen, so that a nano-circuit or a nano-structure can be formed on the surface of the specimen.

According to the present invention, it comes to be able to form extremely small nano-structures, diameters of which are 50 nm or less, so that one of technique for nano-engineering can be established.

What is claimed is:

1. A conductive probe for a scanning type microscope that obtains substance information of a surface of a specimen by a conductive nanotube probe needle which is adhered to a cantilever, characterized in that said probe comprises a conductive film formed on said cantilever, a conductive nanotube of which base end portion is disposed in contact with a surface of a predetermined portion of said cantilever, and a conductive deposit which is coated from said base end portion of said conductive nanotube to a part of said conductive film so as to fasten said conductive nanotube, wherein said conductive nanotube and said conductive film are caused to be electrically connected by said conductive deposit.

2. A conductive probe for a scanning type microscope that obtains substance information of a surface of specimen by a tip end of a conductive nanotube probe needle which is fastened to a cantilever, characterized in that said probe comprises a conductive film formed on a surface of said cantilever, a conductive nanotube of which base end portion is disposed in contact with a surface of a predetermined portion of said conductive film, and a conductive deposit that is coated on the base end portion of said conductive nanotube so as to fasten said conductive nanotube, wherein said conductive nanotube and said conductive film are caused to be electrically connected by said conductive deposit.

3. The conductive probe for a scanning type microscope according to claim 1 or 2, further comprising a conductive coating film formed on said conductive deposit so that said conductive coating film reaches said conductive nanotube and said conductive film, thus securing a conductivity between said conductive nanotube and said conductive film.

4. A conductive probe for a scanning type microscope that obtains substance information of a surface of specimen by a tip end of a conductive nanotube probe needle which is fastened to a cantilever, characterized in that said probe comprises a conductive nanotube of which base end portion is disposed in contact with a surface of a predetermined portion of said cantilever, a conductive deposit which is coated on said base end portion so as to fasten said conductive nanotube to said cantilever, and a conductive coating film which is formed so as to cover from said conductive deposit to said conductive nanotube and said cantilever, wherein said conductive nanotube and said conductive film are caused to be electrically connected.

5. The conductive probe for a conductive scanning type microscope according to claim 3, wherein said coating film is formed so as to coat a tip end portion and a tip end of said nanotube.

6. The conductive probe for a conductive scanning type microscope according to claim 5, wherein a conductive substance which constitutes said conductive coating film is a magnetic substance.

7. A method for processing a specimen using a conductive probe for a scanning type microscope, characterized in that said method uses the probe according to claim 5 of which conductive coating film is made of a metal film so as to serve as a metal source, and said method is comprised of the steps of: applying a predetermined voltage between said probe and said specimen, ion-emitting metallic atoms of said metal source by electric field from a tip end of said nanotube to a surface of said specimen, and forming a metallic deposit on said surface of said specimen.

8. The method for processing a specimen according to claim 7, wherein a diameter of said metallic deposit is 50 nm or less.

9. The conductive probe for a conductive scanning type microscope according to claim 4, wherein said coating film is formed so as coast a tip end portion and a tip end of said nonatube.

* * * * *